Dec. 22, 1964  I. R. RITSEMA  3,162,026
UNIVERSAL JOINT
Filed Aug. 23, 1963  2 Sheets-Sheet 1
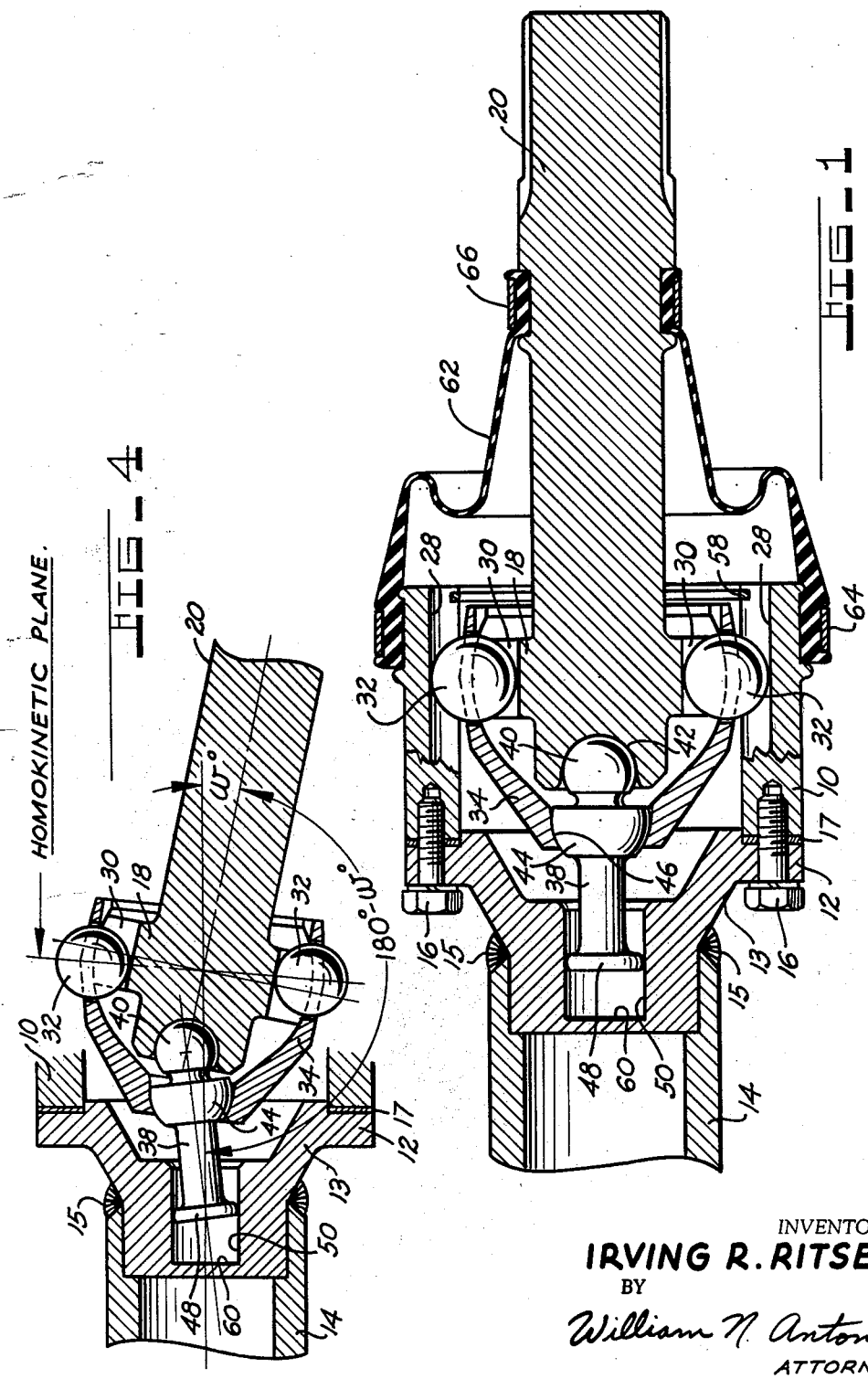
INVENTOR.
IRVING R. RITSEMA.
BY
*William N. Antonis*
ATTORNEY.

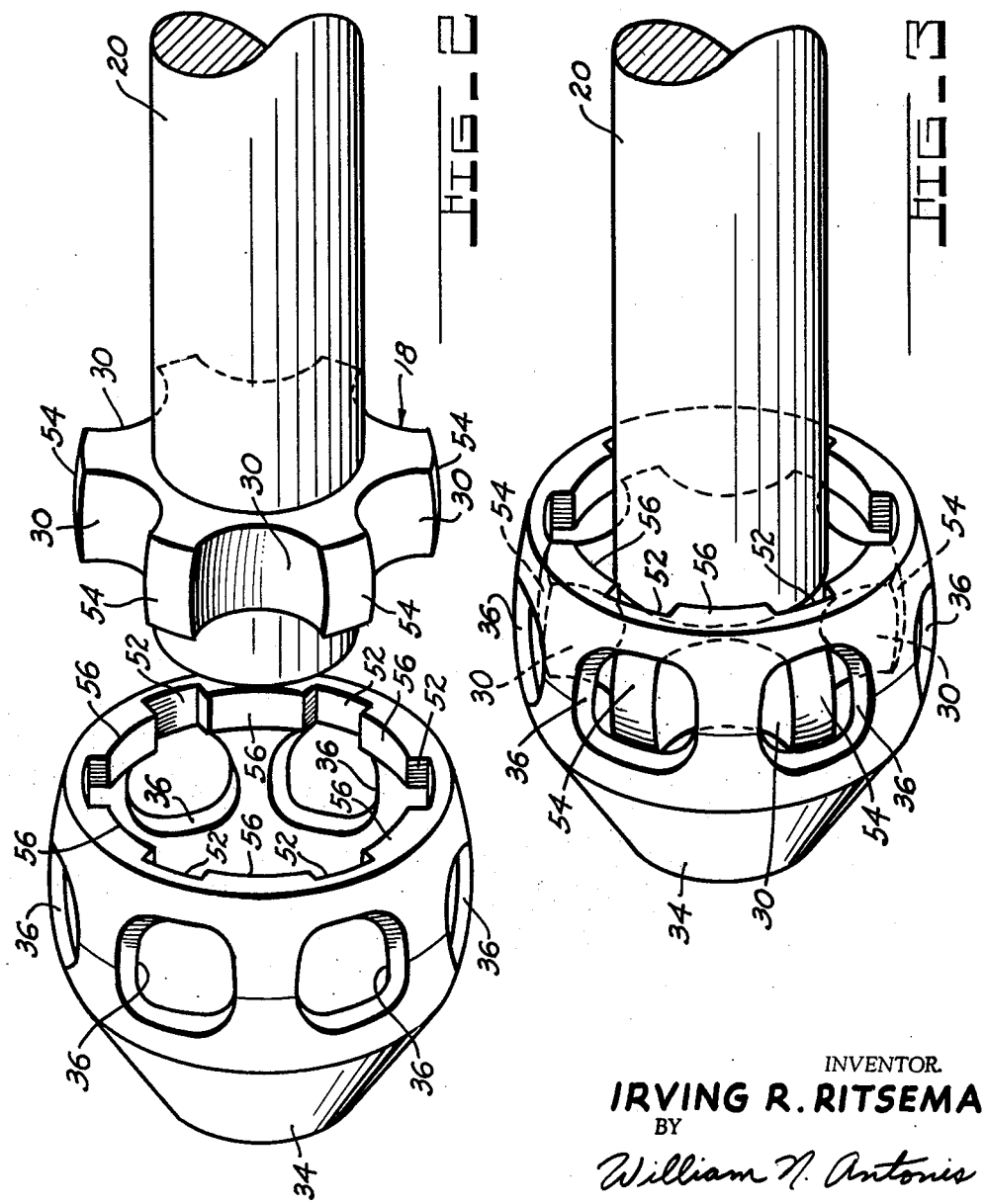

United States Patent Office 3,162,026
Patented Dec. 22, 1964

3,162,026
UNIVERSAL JOINT
Irving R. Ritsema, South Bend, Ind., assignor to The Bendix Corporation, South Bend, Ind., a corporation of Delaware
Filed Aug. 23, 1963, Ser. No. 304,127
4 Claims. (Cl. 64—21)

This invention relates to universal joints and more particularly to universal joints of the constant velocity type in which torque is transmitted from a primary (input) shaft to a secondary (output) shaft through a variable angle by means of power transmitting elements.

More specifically, this invention relates to improvements in a constant velocity universal joint of the type described in my copending patent application Serial Number 228,968 in which a plurality of balls are utilized to transmit rotary motion from an input shaft to an output shaft in such a manner that the speed ratio between the input and output shafts remains constant in all portions of the cycle of each rotation of the shafts, no matter what the relative angular position of the shafts and their axes may be.

In universal joints of the type described in my aforementioned patent application, it has been necessary in the past to fabricate the inner ball race member separately and to subsequently attach it to its associated shaft through means of splines in order to assemble the universal joint. Such a procedure, which is described and shown in Rzeppa Patent No. 1,916,442, was necessary because the inner ball race member had to be positioned at a 90° angle with respect to the cage in order to insert it therein. In other words, universal joints of this type could not be assembled, if the inner ball race member were formed as an integral part of its associated shaft.

Accordingly, it is an object of this invention to provide a constant velocity universal joint of the type described in which the inner ball race member may be formed as an integral part of its associated shaft thereby eliminating the necessity of splining the inner race member to its shaft.

Another object of this invention is to provide a constant velocity universal joint which may be easily and quickly assembled.

A further and important object of this invention is to provide a universal joint assembly which will permit the inner ball recess to be designed and cut closer to the center axis of the universal joint than was heretofor possible, thereby producing an overall smaller universal joint.

The above and other objects, features, and advantages of the invention will become apparent from the following description taken in connection with the accompanying drawings which form a part of this invention and in which:

FIGURE 1 is a sectional view through a universal joint constructed in accordance with my invention;

FIGURE 2 is a dimetric exploded viewshowing two of the components of the universal joint shown in FIGURE 1 prior to assembly;

FIGURE 3 is a dimetric view similar to FIGURE 2 which shows the position of the components durnig assembly; and FIGURE 4 is a diagrammatical illustration of the universal joint shown in FIGURES 1–3.

Referring to FIGURES 1–3 it will be seen that numeral 10 indicates an outer hollow cylindrical member which is adapted to be secured to the flange 12 of shaft attachment 13 through suitable means such as bolts 16, only two of which are shown. A shaft 14 is suitably connected to the shaft attachment 13 through means such as weld 15. A gasket 17 is located between the outer member 10 and flange 12 and is in sealing engagement therewith. An inner ring member 18 is located within the outer hollow cylindrical member 10 and is formed as an integral part of shaft 20.

Formed on the inner cylindrical surface of the outer member 10 are six parallel straight race grooves 28 which are arranged to form cylindrical spaces with six corresponding parallel straight race grooves 30 formed on the outer cylindrical surface of inner ring member 18. Six power transmitting balls 32, one of which movably engages each corresponding set of straight race grooves 28 and 30, are utilized for transmitting torque from the outer member 10 to the inner member 18, or vice versa. In order to maintain all of the balls 32 in a common plane, a cage 34 having six non-round apertures 36, each of which contains one of the balls, is located intermediate the outer and inner members 10 and 18. As shown in FIGURE 4, in order for the device to transmit torque at constant angular velocity, it is necessary to maintain the power transmitting balls 32 in a plane which bisects the supplementary angle $180°-\omega°$ formed by the shafts 14 and 20. This plane, that bisects the supplementary shaft angle, is known as the homokinetic plane. In the type of universal joint being described, the balls are kept in the homokinetic plane through positioning means which includes the previously described cage 34 and a lever 38 which is utilized to cause movement of the cage.

The lever 38 has a substantially spherical portion 40 formed at one end thereof which pivotally engages socket recess 42 located in the end of shaft 20 and an intermediate substantially spherical surface portion 44 which pivotally bears against a substantially spherical bearing surface 46 of cage 34. The other end 48 of lever 38 is located in a cylindrical axial recess 50 formed in shaft 14 and is formed for pivotal and unrestricted sliding engagement therein. It should be noted that socket recess 42 in shaft 20 prevents movement of the lever in one direction and the bearing surface 46 formed on cage 34 which partially surrounds the intermediate portion 44 of the lever, prevents movement of the lever in the opposite direction. In effect the lever is confined between the shaft 20 and the cage 34. Thus, the described universal joint comprises two relatively movable unitary assemblies one of which includes the outer hollow cylindrical member 10, shaft attachment 13, and shaft 14; and the other of which includes the inner ring member 18, shaft 20, balls 32, cage 34 and lever 38.

Referring to FIGURES 2 and 3, it will be noted that the cage 34 includes a plurality of slots 52 located inside thereof and in line with the apertures 36 for receiving the lands 54 of the inner ring member 18. A plurality of ridges 56 are located between the slots for preventing withdrawal of the inner ring member 18 from the cage after the inner ring member has been rotated by shaft 20 to a position wherein the race grooves 30 of the inner ring member correspond with the apertures 36 of the cage, that is, when the race grooves 30 and apertures 36 are in position to receive balls 32. Because of this arrangement, it is possible to cut the inner ball races closer to the center axis of the universal joint than was heretofore possible, thereby producing an overall smaller universal joint. In addition this particular arrangement eliminates the necessity for splining the inner race member to the shaft and facilitates assembly of the parts. If desired, and design parameters permit, the inner race grooves 30 could be cut so that the surface thereof is tangent with the surface of shaft 20.

In order to protect the universal joint from ingress of dirt and the escape of lubricant, it will be noted from FIGURE 1 that a flexible impervious boot 62 is connected to outer member 10 and to shaft 20 through suitable means such as clamps 64 and 66, respectively.

Operation of the universal joint will be as follows: As illustrated in FIGURES 1 and 4, when the shafts 14 and 20 are moved angularly with respect to each other, the lever 38 will also move angularly with respect to the cylindrical recess 50 in shaft attachment 13. During such angular adjustment, the end 48 of lever 38 will be caused to pivot and slide axially in recess 50. At the same time the spherical end portion 40 and intermediate portion 44 will move in a direction away from the axis of shaft 14. As a result of such movement the intermediate portion 44 which bears against the cage 38 will cause angular movement of the cage. The amount of such angular movement is one-half the relative angular movement of the shafts which will have the effect of placing the balls in the homokinetic plane previously described.

By utilizing corresponding parallel straight race grooves 28 and 30 on the outer and inner members 10 and 18 respectively, it is possible to create a constant velocity universal joint which will provide substantial axial movement of one of the shafts 14 or 20 with respect to the other at all angular positions within the design parameters. It will be noted that in the configuration shown the axial motion or end motion is quite substantial and is limited only by holding ring 58 in one direction and by abutment of lever 38 with the blind end 60 of axial recess 50. The face that the shafts 14 and 20 are moving axially with respect to each other, as well as angularly with respect to each other, does not affect the homokinetic plane of the balls, since the two unitary assemblies of the joint, which were previously described, are functionally in the same operative position for angular movements regardless of relative axial positions therebetween.

In the above described universal joint, when the shafts are at an angle with respect to each other, the balls will roll in their respective race grooves as they are moved through their homokinetic plane. As the shafts move axially with respect to each other, the balls will slide in their races. However, in most applications, the shafts will never move axially without also moving through an angle and rotating. As a result, there will never be true sliding, but instead a combination of rolling and sliding.

The advantages of a constant velocity universal joint wherein the inner race member is integrally formed as part of one of the shafts will be obvious to those skilled in the art. In addition the novel structural arrangement for assembling the inner ball race member within the cage will facilitate assembly and eliminate splining the inner race member to the shaft. Furthermore, although this invention has been described in connection with a specific embodiment, it will be obvious to those skilled in the art that various changes may be made in the form, structure, and arrangement of parts without departing from the spirit of the invention. For example, my invention could be utilized in connection with a universal joint that does not permit end motion.

Accordingly, I do not desire to be limited to the specific embodiment disclosed herein primarily for purposes of illustration, but instead desire protection falling within the scope of the appended claims.

Having thus described the various features of the invention, what I claim as new and desire to secure by Letters Patent is:

1. A universal joint comprising an outer and an inner member, a plurality of lands located within said outer member and on said inner member for forming a plurality of corresponding ball race grooves in said members, a plurality of power transmitting balls movably engaging the corresponding grooves of said members for transmitting torque from one of said members to the other of said members, a ball retainer located between said outer and inner members, said retainer having apertures formed therein for receiving and retaining said balls in said race grooves and for maintaining said balls in a common plane, a plurality of slots located inside of said retainer and in line with the apertures therein for receiving the lands of said inner member during insertion of said inner member within said retainer, and a plurality of ridges located between said slots for preventing withdrawal of said inner member from said retainer after said inner member has been rotated to a position wherein the race grooves of said inner member correspond with the apertures of said retainer.

2. A universal joint comprising primary and secondary shafts, an outer hollow cylindrical member attached to one of said shafts, an inner ring member formed as an integral part of the other of said shafts, a plurality of lands located within said outer member and on said inner member for forming a plurality of corresponding parallel straight race grooves in said members, a plurality of power transmitting balls movably engaging the corresponding grooves of said members for transmitting torque from one of said members to the other of said members, a cage located between said outer and inner members, said cage having apertures formed therein for receiving and retaining said balls in said race grooves and for maintaining said balls in a common plane, a plurality of slots located inside of said cage and in line with the apertures therein for receiving the lands of said inner ring member during insertion of said inner ring member within said cage, and a plurality of ridges located between said slots for preventing withdrawal of said inner ring member from said cage after said inner ring member has been rotated by the other of said shafts to a position wherein the race grooves of said inner ring member correspond with the apertures of said cage.

3. A universal joint having first and second unitary assemblies, said first unitary assembly comprising an outer hollow cylindrical member having a plurality of parallel axially extending straight race grooves formed within said member, said second unitary assembly comprising an inner ring member located within said outer hollow cylindrical member, said ring member having a plurality of lands located thereon for forming a plurality of parallel axially extending straight race grooves capable of cooperating with the straight race grooves in said outer member, a plurality of power transmitting balls movably engaging the grooves of each of said members for transmitting torque from one of said assemblies to the other of said assemblies, a cage located between said outer and inner members, said cage having apertures formed therein for receiving and retaining said balls in said race grooves and for maintaining said balls in a common plane, a plurality of slots located inside of said cage and in line with said apertures for receiving the lands of said inner ring member during insertion of said ring member within said cage, a plurality of ridges located between said slots for preventing withdrawal of said inner ring member from said cage after said inner ring member has been rotated to a position wherein the straight race grooves of said inner ring member correspond with the apertures of said cage, a lever for causing an angular movement of said cage which is substantially one-half the relative angular movement of said assemblies, and means for operatively connecting said inner member, balls, cage and lever to form said secondary unitary assembly.

4. A universal joint comprising primary and secondary shafts, one of said shafts having an axial recess formed therein and the other of said shafts having a socket formed in the end thereof, an outer hollow cylindrical member fixedly connected to one of said shafts, an inner ring member located within said outer hollow cylindrical member and formed as an integral part of the other of said shafts, a plurality of lands located within said outer hollow cylindrical member and on said inner ring member for forming a plurality of corresponding parallel straight race grooves within said hollow cylindrical member and on said inner ring member, said grooves being arranged to permit substantial axial movement of one of said shafts with respect to the other of said shafts at all angular positions of said shafts, a plurality of power transmitting balls movably engaging said corresponding grooves of said members for transmitting torque from one of said members to the other of said members, a cage located between said outer and inner members, said cage having apertures formed therein for receiving and retaining said balls in said race grooves and for maintaining said balls in a common plane, a plurality of slots located inside of said cage and in line with said apertures for receiving the lands of said inner ring member during insertion of said ring member within said cage, a plurality of ridges located between said slots for preventing withdrawal of said inner ring member from said cage after said inner ring member has been rotated by the other of said shafts to a position wherein the straight race grooves of said inner ring member correspond with the apertures of said cage, a lever for causing an angular movement of said cage which is substantially one-half the relative angular movement of said shafts, said lever having one end pivotally engaging said socket, the other end thereof located in said axial recess for pivotal and unrestricted sliding engagement therewith, and an intermediate portion thereof bearing on said cage, said inner ring member, balls, cage, lever and the other of said shafts being operatively connected to form a unitary axially movable assembly.

References Cited by the Examiner

UNITED STATES PATENTS

| | | | |
|---|---|---|---|
| 1,916,442 | 7/33 | Rzeppa | 64—21 |
| 2,352,776 | 7/44 | Dodge | 64—21 |
| 2,432,216 | 12/47 | Suczek | 64—21 |
| 3,067,595 | 12/62 | Faure | 64—21 |

ROBERT C. RIORDON, *Primary Examiner.*